W. C. BURRELL.
TROUGH.
APPLICATION FILED JAN. 26, 1920.
1,432,051.
Patented Oct. 17, 1922.
2 SHEETS—SHEET 1.
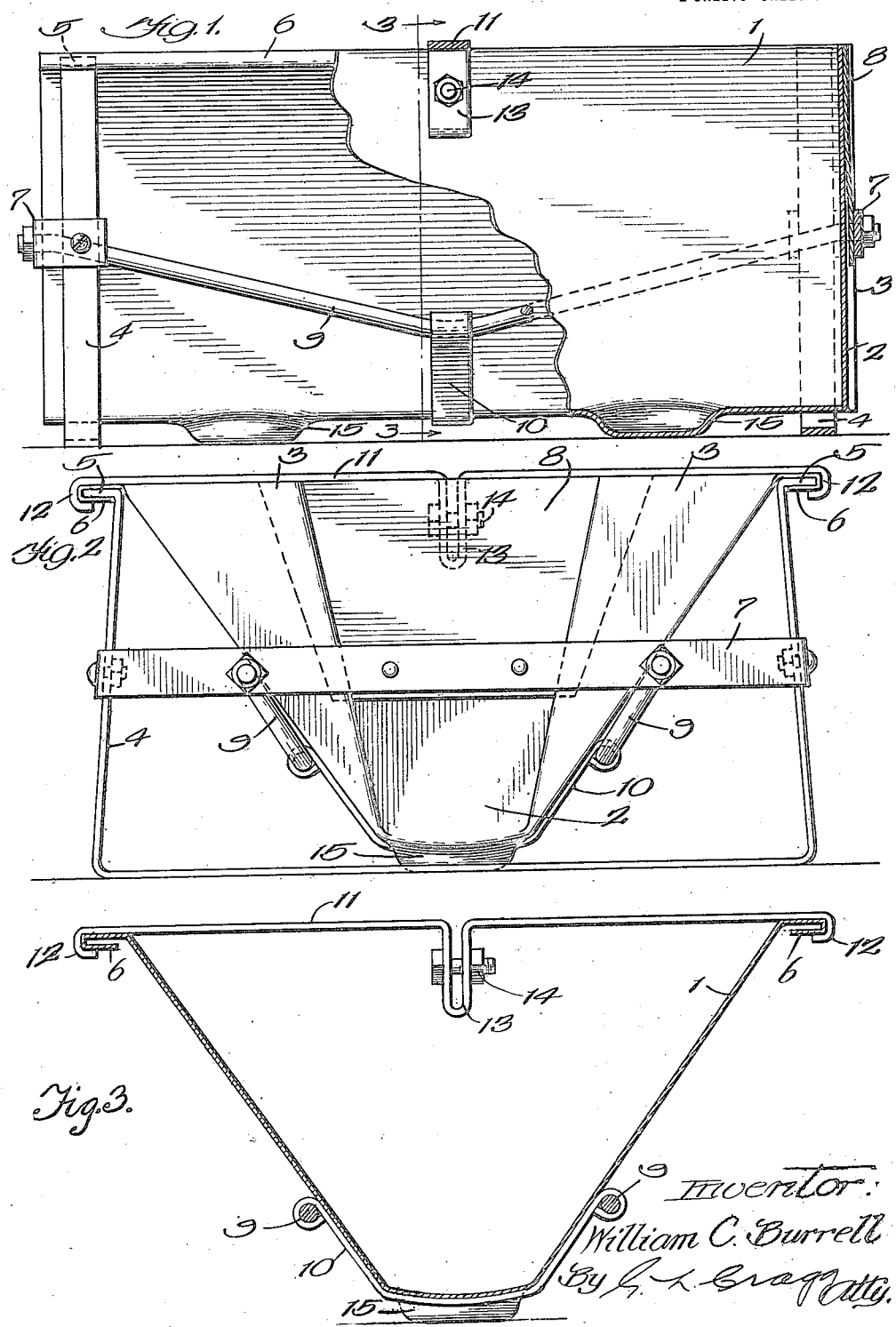

W. C. BURRELL.
TROUGH.
APPLICATION FILED JAN. 26, 1920.
1,432,051.
Patented Oct. 17, 1922.
2 SHEETS—SHEET 2.
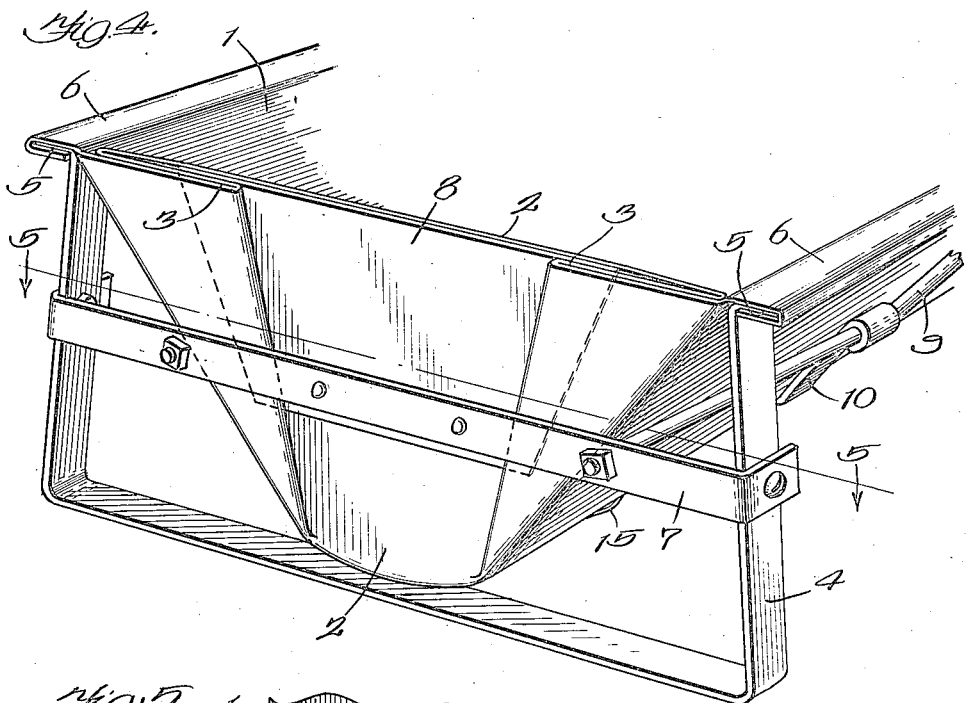
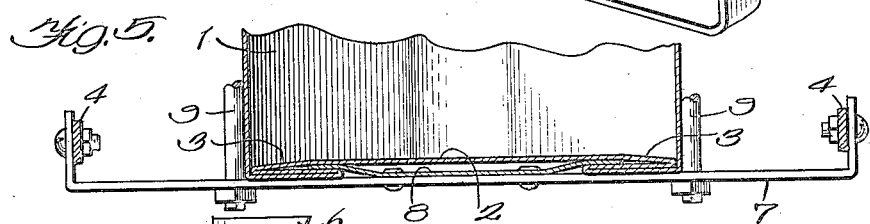
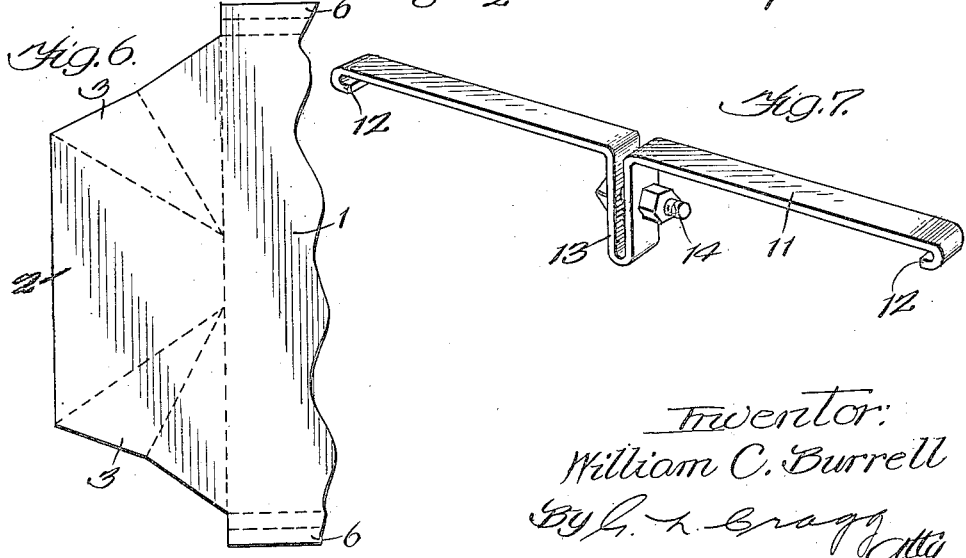
Inventor:
William C. Burrell Patented Oct. 17, 1922.

1,432,051

UNITED STATES PATENT OFFICE.

WILLIAM C. BURRELL, OF KANKAKEE, ILLINOIS, ASSIGNOR TO ROBERTSON BROTHERS MANUFACTURING COMPANY, A CORPORATION OF ILLINOIS.

TROUGH.

Application filed January 26, 1920. Serial No. 353,925.

*To all whom it may concern:*

Be it known that I, WILLIAM C. BURRELL, citizen of the United States, residing at Kankakee, in the county of Kankakee and State of Illinois, have invented a certain new and useful Improvement in Troughs, of which the following is a full, clear, concise, and exact description.

My invention relates to troughs or receptacles and is of particular service when embodied in an animal watering or feeding trough and has a number of objects and advantages in view.

The invention has for one of its objects the provision of improved means for maintaining the supports that are provided at the end of a receptacle in assembly with the receptacle. These means enable me to employ a hanger for supporting a mid portion of the receptacle to prevent this portion from sagging. The structure realizing this object of my invention includes two trough supports, one at each end of the trough and having a member extending across and engaging such trough end, and a brace rod upon each side of the trough in connection with the aforesaid supporting members to hold them in engagement with the trough ends and serving as a support for the hanger that underlies the intermediate portion of the trough.

I will explain my invention more fully by reference to the accompanying drawings in which Fig. 1 is a view in side elevation, partially in section, with parts broken away, of a trough constructed in accordance with the invention; Fig. 2 is an end view of the trough shown in Fig. 1; Fig. 3 is a sectional view on line 3—3 of Fig. 1; Fig. 4 is a perspective view of one end of the trough structure; Fig. 5 is a sectional view on line 5—5 of Fig. 4; Fig. 6 illustrates a part of the blank piece of sheet metal out of which the trough may be formed; and Fig. 7 illustrates a preferred form of brace.

Like parts are indicated by similar characters of reference throughout the different figures.

The trough 1 shown in Fig. 1 is there illustrated shorter, in proportion to its other dimensions, than it would actually be, owing to lack of space. The sheet metal out of which the trough is formed is generally oblong in shape but has the form at each end which is illustrated at one end in Fig. 6. The trough is preferably somewhat of triangular shape in cross section having downwardly converging side walls and suitably shaped end walls 2 being integrally formed with the side walls of the trough, the metal at the four corners of the trough between the side walls and each end wall being formed into downwardly tapering Z-folds 3. The trough, thus formed, may be free of perforations and cracks, requiring no soldering in any portion thereof to prevent leakage.

I provide a trough support 4 at each end, each of these supports being preferably made of strap iron formed into U-shape with the base of the U parallel with the top of the trough and the top ends of the sides of the U outturned, as indicated at 5, to be received between the sides of the folded longitudinal marginal portions 6 of the trough.

Each support 4 has a member 7, also preferably of strap iron which is bolted or riveted to the sides of the support 4 and extends across and engages the adjacent trough end 2. Each supporting member 7 carries a sheet of metal 8, constituting an added part of such member, the sheet metal portion 8 being receivable and held between the adjacent layers of each Z-fold 3 at the adjacent end of the trough. As illustrated, the sheet metal portion 8 of the support 4 is upon the exterior of the trough, the Z-folds 3 that receive the portions 8 firmly gripping these portions to hold the support and trough in assembly, a result that is accomplished without the aid of rivets or bolts that otherwise would be required to be passed through the sheet metal of the trough for the purpose of assembling the trough with a support.

The supports 4 at the opposite ends of the trough are held in close assembly with the adjacent ends of the trough by means of truss rods 9 which pass through the members 7 and are bolted or riveted thereto. The truss rods are desirably bent so that they may be suitably tightened into engagement with the supporting members 7.

A hanger 10 underlies the trough and is in supporting engagement with an intermediate portion thereof, this hanger being supported, in turn, upon the mid portions of the truss rods 9. By this arrangement not only are the supports for the ends of the trough held in firm relation but the trough is also supported at its end portion to avoid the sagging of this portion thereof.

Where the trough is of considerable length I prevent it from spreading at its mid portion by means of a brace bar 11 formed at its ends with hooks 12 into which the longitudinal marginal portions 6 of the trough are received. I make the brace bar 11 extensible and contractible by forming it with a U-shaped fold 13 at a mid portion thereof. When the brace bar is applied the fold 13 may be widened sufficiently to permit the ends of the hooks 12 to clear the marginal portions 6 of the trough as the brace bar is lowered into place. When the marginal portions 6 are in register with the receiving spaces of the hooks the fold 13 is contracted as by means of the bolt 14.

I have illustrated the folds of the trough as tapering downwardly and as paralleling the ends of the trough, but I do not wish to be limited to the shape of the folds nor to the part of the structure against which they are placed. The downwardly tapering Z-folds are desirably present in a trough shaped as illustrated as these folds limit themselves to such a shaping of the sheet metal out of which the trough is made that the very bottom of the trough may be in the form of a longitudinal segment of a cylinder with the sides of the trough angular to and diverging upwardly away from the cylinder segment bottom of the trough. Thus shaping the trough at its bottom and sides enables a feeding animal to remove practically all of the contents from the trough without waste, troughs of other shapes either holding some of its contents in the very bottom thereof so as to be unaccessible or being so shaped as to permit the feeding animal readily to throw the trough contents over the sides thereof. As a further feature of the invention I depress the bottom of the trough at one or more places 15 slightly to increase the capacity of the trough and also serving as feet for the trough to rest upon the ground, the presence of these feet being especially desirable in the event of excessive length between the ends of the trough and the hanger 10 at the mid portion of the trough.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. A trough; in combination with two trough supports, one at each end of the trough and having a member extending across and engaging such trough end; of a brace rod upon each side of the trough and connecting the aforesaid members of the trough supports; and a hanger underlying and in supporting engagement with an intermediate portion of the trough and itself supported by said brace rods.

2. A trough having folded longitudinal side marginal portions; in combination with a support formed of strap metal outwardly turned at its ends, these outturned ends being received between the sides of the folded longitudinal marginal portions of the trough.

3. A trough having a trough body with side and end walls and a bottom, a support at each end of the body for supporting the same, a pair of truss rods interconnecting the supports on opposite sides of the body, and a hanger suspended between the truss rods intermediate their ends and passing beneath the bottom of the trough to assist in supporting the mid-section thereof.

4. A trough having a trough body provided with a fold along each longitudinal edge, a support formed from strap metal at each end of the body and having portions held within the folds of the body, a member for bracing each support, a pair of truss rods interconnecting the members and extending along opposite sides of the body, and a hanger suspended between the truss rods and supporting a mid-section of the body.

In witness whereof, I hereunto subscribe my name this sixteenth day of January A. D., 1920.

WILLIAM C. BURRELL.